March 4, 1930.  O. C. MATTHEWS ET AL  1,749,387
TRAFFIC SIGNAL
Filed June 13, 1927
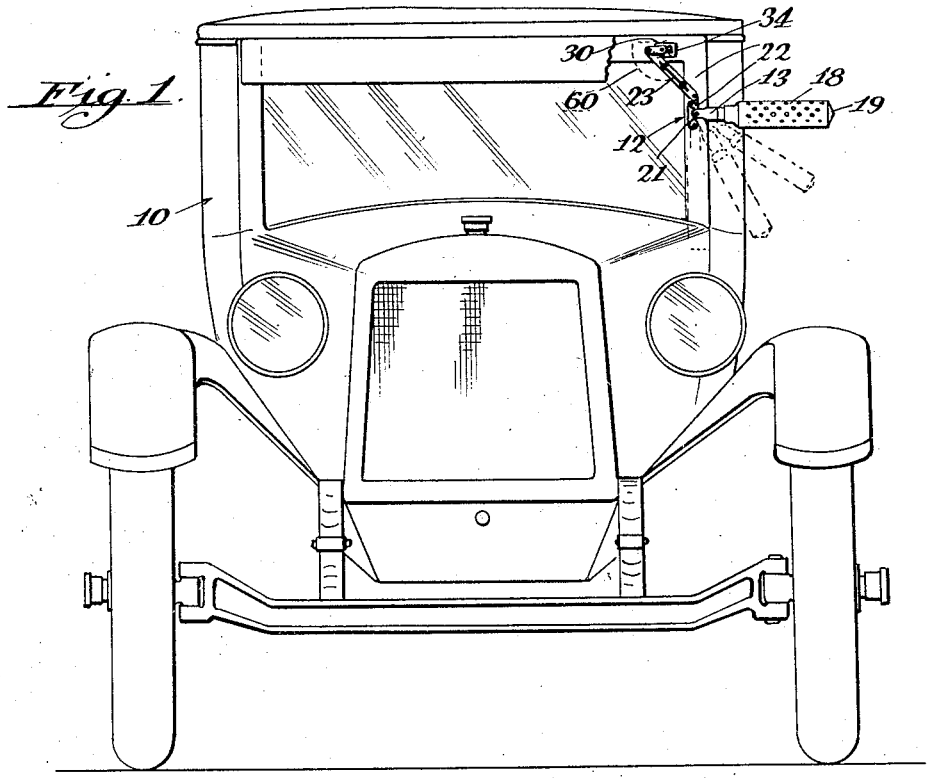
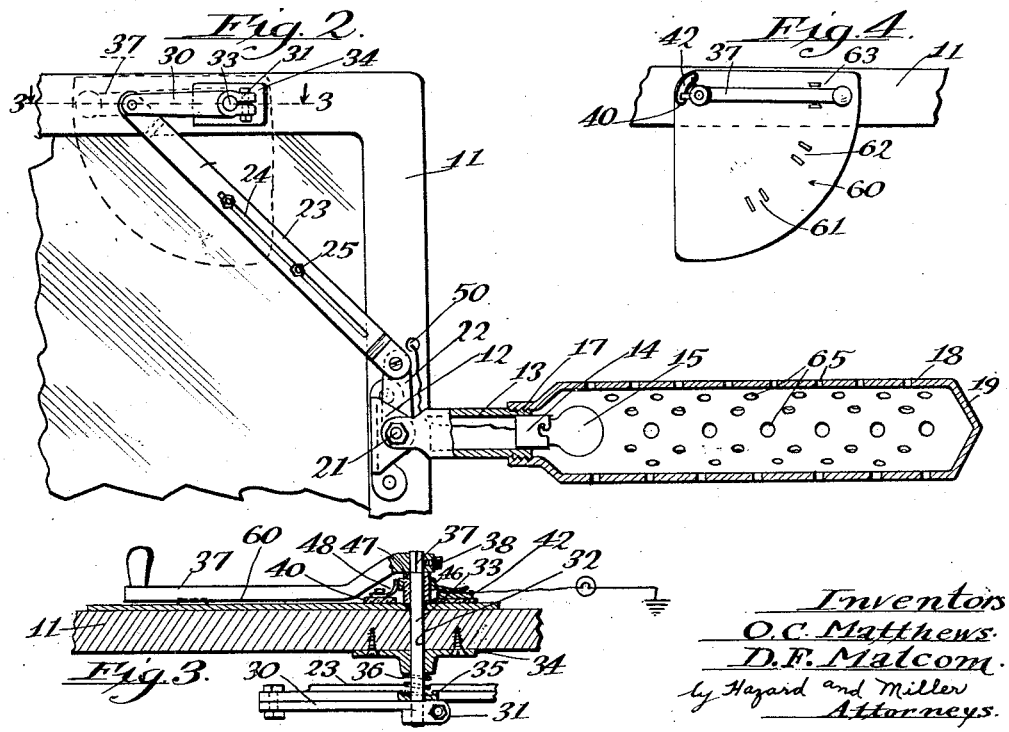

Patented Mar. 4, 1930

1,749,387

UNITED STATES PATENT OFFICE

OSIE C. MATTHEWS AND DOLOR F. MALCOM, OF SAN BERNARDINO, CALIFORNIA; SAID MALCOM ASSIGNOR TO FLOYD E. JONES AND PEARL P. MATTHEWS, OF SAN BERNARDINO, CALIFORNIA

TRAFFIC SIGNAL

Application filed June 13, 1927. Serial No. 198,431.

This invention relates to signaling apparatus, and in particular to a mechanical signaling device to be used in connection with moving vehicles such as automobiles and the like, and it is an object of this invention to provide a signal which is readily attachable to a vehicle and which will enable the driver of a succeeding vehicle to visibly predetermine the positive motions of the preceding vehicle. The device is especially designed for use upon a closed motor car and will enable the driver to give his signal without having to open the window.

A further object of the invention is to provide a device which may be applied to a moving vehicle, which embodies mechanical means whereby the driver of a vehicle, upon making a turn to the right or left, slowing down or stopping, may cause an illuminated signal to be moved to a predetermined position to attract the attention of the driver of a succeeding vehicle, and to designate to him a predetermined action on the part of the operator.

A still further object of the invention is to provide a device which depends upon the electro-motive power stored or generated by the vehicle for its illumination features.

A still further object of the invention is to provide a device which is attractive in its appearance and which is inexpensive to manufacture, is unlikely to get out of order, contains relatively few moving parts, and is well adapted to perform the services required of it. Convenience of arrangement, lightness and comparative inexpense of manufacture are further desiderata which have been borne in mind in the production and development of the invention.

With these and many other objects in view, which will more readily appear as the nature of the invention is better understood, the same consists in the novel construction, combination and arrangement of parts, which will hereinafter be more fully described, illustrated, and claimed.

The essential features of the invention involved in the carrying out of the objects indicated are susceptible to modification; but a preferred embodiment of the invention is shown in the accompanying drawings, in which:

Figure 1 is a front elevation of a vehicle of the closed type, showing the invention applied thereto in operative position.

Fig. 2 is an enlarged detailed view partly in section, showing the device attached to one of the wind-shield braces.

Fig. 3 is a sectional view taken substantially along the line 3—3 of Figure 2, and Fig. 4 is an elevation of the actuating lever taken from a point within the vehicle.

Referring to the accompanying drawings wherein similar reference characters designate similar parts throughout, the various figures described above adequately illustrate our invention, and the following detailed description is commensurate with the above mentioned drawings in enabling an artisan to construct and assemble the constituent parts of the same.

In the accompanying drawings the reference numeral 10 designates a motor vehicle having a wind-shield frame 11. A bracket 12 is mounted on this frame at a point adjacent the driver's seat, and a hollow arm 13 is pivoted to this wind-shield frame 10. This hollow arm has mounted therein, the conventional type of lamp socket 14, and a lamp 15 is disposed within this socket. The outer end of the hollow arm 13 is threaded exteriorly and is adapted to receive the reduced threaded end 17 of a perforated casing 18. This casing is in the form of a hollow tubular member and is closed at one end as at 19. The arm 13, as stated before, is pivoted to the bracket 12 by means of a pintle 21 extending through this arm and the bracket. A bell crank lever 22 is formed on one end of the member 13, and an operating link 23 transmits motion to this bell crank lever 22. The link 23 is formed in two pieces, each of which has a central slot 24 formed therein, and suitable clamping means 25 extends through these slots so that the length of the link 23 is adjustable. The link 23 is connected to a lever 30, which lever has a clamping journal 31 on one end thereof. An aperture 32 is formed through the frame of the wind-shield, and a shaft 33 extends through this aperture. The clamping member 31 is clamped on the outer end of this shaft, and a bracket 34 is attached to the frame so that the shaft 33 extends through the same. A cup washer 35 is spring pressed by means of a coil-spring 36 between the bracket 34 and the journal clamp 31 for a purpose to be described hereinafter. The other end of the shaft is adapted to have attached thereto an operating handle 37, which operating handle is secured to this shaft 33 by a suitable lock nut or the like 38. It will be seen therefore, that rotation of the handle member 37 will cause rotation of the lever 30 and consequent movement of the link 23 and signal casing 18. An insulating ring 40 is mounted on the inside of the wind-shield frame and surrounds the aperture 32. Mounted on this insulating member is a sector contact 42 clearly shown in Figure 4. An insulating collar 45 is securely mounted on the shaft, and disposed on this insulating collar is a contact arm 46. This contact arm has a bearing surface 47 adapted to bear against a brush 48 mounted on the insulating ring 40. The brush 48 is operatively connected by means of a conductor or the like, through an aperture 50 in the wind-shield frame to the lamp 15. Current is led from the battery to the sector contact 42 and passes through the contact arm 46 to the brush 48, and thus to the lamp. When the signal is in its lowermost position as shown in the dotted lines of Figure 4, the contact arm 46 is disengaged from the sector contact 42 and no current will be imparted to the lamp. A sector plate 60 is mounted on the wind-shield frame and depends therefrom, and the operating handle 37 bears against this plate. A plurality of stops 61, 62 and 63 are mounted on this sector plate and serve to retain the operating handle in a plurality of predetermined positions. The spring 36 imparts a thrust to the shaft 23, and as a result the handle 37 bears directly against this sector plate with frictional resistance.

The above parts are thought to adequately define our invention, and we will now proceed with a description of the operation of the device.

When the driver of a vehicle desires to make a turn to the right, the operating handle 37 is elevated so as to be received by the stop 63. The link 23 as a result thereof, will operate the bell crank arm 22 so as to cause the signal to occupy a horizontal position. Current will pass from the battery through the sector contact 42, contact arm 46, brush 47 and conductor, to the lamp 15, and the same will be illuminated and light will issue through the apertures 65 in the perforated casing 18. Thus the casing 18 will be visible to the driver of a succeeding vehicle, and suggest to him that the driver of the preceding vehicle is about to make a turn to the right. If the driver of the preceding vehicle is about to make a turn to the left, he moves the handle member 37 to occupy a position within the stop 62, and motion will be transmitted to the casing 18 and the same will occupy a downwardly inclined position as shown in Figure 1, while at the same time, current will be supplied to the lamp. If the driver intends to stop, the handle is lowered to occupy a position within the stop 61 and the casing 18 will be further lowered as shown in Figure 1, while at the same time, the lamp will be illuminated. However, when the device is not in use, the handle is completely lowered to occupy a vertical position, and the contact arm 46 will no longer engage the contact member 42 so that the lamp will be extinguished and the device will occupy the vertical position shown in Figure 1.

From the foregoing, it is thought that the construction, use and many advantages of the herein-described traffic signal will be adequately understood. It will be further understood that certain material alterations in the construction may be effected without having a deleterious effect upon the efficiency of the device. The minor details in the construction will at all times of course, be performed within the scope and spirit of the sub-joined claims.

What we claim by this invention and desire to secure by Letters Patent, is:

1. A direction indicator of the character described, comprising an arm adapted to be pivotally mounted on the front of a vehicle adjacent one side thereof, a perforated tubular casing rigid with said arm, illuminating means arranged within said casing, a bell crank lever rigid with said arm, a shaft journalled in the front of said vehicle adjacent the top thereof, a second lever rigid with said shaft, a link pivoted to both levers, and an operating handle rigid with said shaft inside the vehicle.

2. A direction indicator of the character described, comprising an arm adapted to be pivotally mounted on the front of a vehicle adjacent one side thereof, a perforated tubular casing rigid with said arm, illuminating means arranged within said casing, a bell crank lever rigid with said arm, a shaft journalled in the front of said vehicle adjacent the top thereof, a second lever rigid with said shaft, a link pivoted to both levers, an operating handle rigid with said shaft inside the vehicle, a rigid sector plate disposed within the vehicle, and means on said plate for releasably retaining said handle in selected position.

In testimony whereof we have signed our names to this specification.

OSIE C. MATTHEWS.
DOLOR F. MALCOM.